US012163737B2

(12) United States Patent
López Lage et al.

(10) Patent No.: US 12,163,737 B2
(45) **Date of Patent: *Dec. 10, 2024**

(54) METHOD FOR HEATING A BLANK AND HEATING SYSTEM

(71) Applicant: AUTOTECH ENGINEERING, S.L., Amorebieta-Etxano (ES)

(72) Inventors: Manuel López Lage, Sant Esteve Sesrovires (ES); Jordi Castilla Moreno, Sant Esteve Sesrovires (ES); Daniel Merino Fernández, Sant Esteve Sesrovires (ES)

(73) Assignee: AUTOTECH ENGINEERING, S.L., Amorebieta-Etxano (ES)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,412

(22) Filed: Jul. 14, 2023

(65) Prior Publication Data

US 2023/0358473 A1 Nov. 9, 2023

Related U.S. Application Data

(63) Continuation of application No. 16/463,201, filed as application No. PCT/EP2017/084119 on Dec. 21, 2017, now Pat. No. 11,740,023.

(30) Foreign Application Priority Data

Dec. 22, 2016 (EP) .................................... 16382645

(51) Int. Cl.
*F27B 9/24* (2006.01)
*C21D 9/46* (2006.01)

(52) U.S. Cl.
CPC .................. *F27B 9/24* (2013.01); *C21D 9/46* (2013.01); *C21D 2221/00* (2013.01)

(58) Field of Classification Search
CPC ........ C21D 1/34; C21D 2221/00; C21D 9/46; F27B 9/202; F27B 9/24; F27D 3/026
(Continued)

(56) References Cited

U.S. PATENT DOCUMENTS

| | | | |
|---|---|---|---|
| 6,019,211 | A | 2/2000 | Masciarelli |
| 8,529,250 | B2 | 9/2013 | Schwartz |

(Continued)

FOREIGN PATENT DOCUMENTS

| | | | |
|---|---|---|---|
| CN | 102482725 | A | 5/2012 |
| DE | 102014110415 | A1 | 1/2016 |

(Continued)

OTHER PUBLICATIONS

International Search Report and Written Opinion for International Application No. PCT/EP2017/084119, Search Report dated Feb. 28, 2018, 8 pages.

*Primary Examiner* — Jessee R Roe
*Assistant Examiner* — Michael Aboagye
(74) *Attorney, Agent, or Firm* — Squire Patton Boggs (US) LLP

(57) ABSTRACT

A method for manufacturing a steel component from a blank is provided. Firstly, a blank is placed in a conveyor system. Then, at least a preselected zone of the blank is preheated while the blank is retained at a predetermined preheating location. Finally, the blank is conveyed through a furnace. A preheating system for heating blanks in a production line is also provided.

3 Claims, 6 Drawing Sheets

(58) Field of Classification Search
USPC ......... 266/249; 148/559, 639, 641, 657, 661
See application file for complete search history.

(56) References Cited

U.S. PATENT DOCUMENTS

| | | | | |
|---|---|---|---|---|
| 8,733,144 | B2 | 5/2014 | Pohl et al. | |
| 9,010,524 | B2 | 4/2015 | Dörr | |
| 9,308,564 | B2 | 4/2016 | Potocki et al. | |
| 9,631,248 | B2 | 4/2017 | Hwang et al. | |
| 10,612,108 | B2 | 4/2020 | Haslmayr et al. | |
| 10,799,929 | B2 | 10/2020 | Hahn | |
| 11,219,937 | B2 * | 1/2022 | Lopez Lage | C21D 9/46 |
| 11,740,023 | B2 * | 8/2023 | López Lage | F27B 9/202 148/654 |
| 2009/0320968 | A1 | 12/2009 | Boeke et al. | |
| 2011/0283851 | A1 | 11/2011 | Overrath et al. | |
| 2012/0152410 | A1 | 6/2012 | Sikora et al. | |
| 2017/0037489 | A1 * | 2/2017 | Schwartz | C21D 9/0068 |

FOREIGN PATENT DOCUMENTS

| | | | |
|---|---|---|---|
| EP | 2233593 | A2 | 9/2010 |
| EP | 2 615 396 | A1 | 7/2013 |

* cited by examiner

METHOD FOR HEATING A BLANK AND HEATING SYSTEM

CROSS-REFERENCE TO RELATED APPLICATIONS

This application is a continuation of U.S. application Ser. No. 16/463,201 (U.S. Pat. No. 11,740,023), filed May 22, 2019, which is a National Stage filing under 35 USC 371 of International Application No. PCT/EP2017/084119, filed Dec. 21, 2017, which claims priority to and the benefit of European Patent Application 16382645.6, filed Dec. 22, 2016, the entire contents of each of which are herein incorporated by reference in their entirety for all purposes.

The present disclosure relates to heating systems, in particular to heating systems comprising a preheating system. The present disclosure further relates to methods for manufacturing steel components including hot forming of blanks.

BACKGROUND

In the automotive industry, the development and implementation of lightweight materials or components is becoming more important in order to satisfy criteria for manufacturing lighter vehicles. The demand for weight reduction is especially driven by the goal of reduction of $CO_2$ emissions. Additionally, the growing concern regarding occupant safety also leads to the adoption of materials which improve the integrity and the energy absorption of the vehicle during a crash.

Hot stamping is a process which allows manufacturing hot formed structural components with specific properties which may include features such as a high strength, reduced thickness of components and lightness.

In a hot stamping production line system, a furnace system heats steel blanks at a predetermined temperature, e.g. above an austenization temperature, particularly above Ac3 and softens the blanks to be hot formed. As the blanks exit the furnace, the blanks may be centered on a centering table to correctly place the heated blanks before being transferred to the press tool.

A conveyor system in such a production line is configured to convey blanks to and through a furnace. The furnace and the conveyor system are configured such that the blanks are heated to a desired temperature and for a desired time period (e.g. 3-10 minutes) before exiting the furnace. The transportation of the components through the furnace takes place on e.g. roller conveyors.

After centering, the blanks are transferred to a press system which deforms the blanks to the shape of the end product. After the press step, post operations such as trimming or drilling holes may be performed.

Typically in the automotive industry, High Strength Steel or Ultra High Strength Steel (UHSS) blanks are used for manufacturing components of a structural skeleton. The structural skeleton of a vehicle, e.g. a car, in this sense may include e.g. a bumper, pillars (A-pillar, B-pillar, C-pillar), side impact beams, a rocker panel, and shock absorbers.

UHSS can exhibit an optimized maximal strength per weight unit and advantageous formability properties. UHSS may have an ultimate tensile strength of at least 1000 MPa, preferably approximately 1500 MPa or up to 2000 MPa or more.

The steel blanks can obtain a suitable microstructure with high tensile strength by cooling the blanks in the press or after the press. Depending on the composition of the base steel material, blanks may need to be quenched, i.e. be cooled down rapidly from a high temperature to a low temperature, to achieve a high tensile strength.

An example of steel used in the automotive industry is 22MnB5 steel. The composition of 22MnB5 is summarized below in weight percentages (rest is iron (Fe) and impurities):

| C | Si | Mn | P | S | Cr | Ti | B | N |
|---|---|---|---|---|---|---|---|---|
| 0.20-0.25 | 0.15-0.35 | 1.10-1.35 | <0.025 | <0.008 | 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. In other examples the 22MnB5 may contain approximately 0.23% C, 0.22% Si, and 0.16% Cr. The material may further comprise Mn, Al, Ti, B, N, Ni in different proportions.

Usibor® 1500P commercially available from Arcelor Mittal, is an example of UHSS which is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor® is summarized below in weight percentages (rest is iron (Fe) and impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Various other steel compositions of UHSS may also be used in the automotive industry. Particularly, the steel compositions described in EP 2 735 620 A1 may be considered suitable. Specific reference may be had to table 1 and paragraphs 0016-0021 of EP 2 735 620, and to the considerations of paragraphs 0067-0079. In some examples the UHSS may contain approximately 0.22% C, 1.2% Si, and 2.2% Mn. These steels may be air hardened, i.e. they do not require quenching in e.g. a press tool in order to obtain a martensitic microstructure.

Steels of any of these compositions (22MnB5 steels in general, and Usibor® in particular) may be supplied with a coating in order to prevent corrosion and oxidation damage. This coating may be e.g. an aluminum-silicon (AlSi) coating or a coating mainly comprising zinc or a zinc alloy.

The increase in a component strength obtained by these processes and materials may allow for a thinner gauge material to be used, which results in weight savings over conventionally cold stamped mild steel components for automotive applications.

Simulations performed during the design phase of a typical vehicle component can identify points or zones of the formed component that need reinforcement (because lighter and thinner metal sheets and blanks are used) in order to increase strength and/or stiffness. Alternatively a redesign may be done in order to steer deformations.

In that sense, there are several procedures with which some zones of a component can be reinforced or softened in order to redistribute stress and save weight by reducing the thickness of the component. These known procedures for reinforcing a component are, for example, procedures adding welded reinforcements prior to any deforming process. Such reinforcements may be "patchworks" in which partial or complete overlapping of several blanks may be used, blanks or plates of different thickness that may be welded "edge to edge", i.e. Tailor Welded Blanks (TWB). Alternatively, blanks may comprise different thicknesses with a continuous thickness transition produced by a controlled adjustment of roll gaps on a cold rolling mill, i.e. Tailor Rolled Blanks (TRB). Structural mechanical requirements can thus be achieved theoretically with a minimum of material and thickness (weight).

A blank with different thicknesses may not be homogenously heated in the furnace, i.e. inner parts of the thick regions may not be sufficiently heated, and thus, the temperature in the whole blank may not be the same. In some examples, the blank may comprise different materials i.e. different properties. Such blanks may be formed e.g. by joining at least two blanks made of different material (which might also have different thicknesses). The resulting blank would therefore comprise the properties of the joined materials.

If the entire blank is not homogeneously heated in the furnace to a predetermined temperature e.g. an austenization temperature or higher, the result of a further hot deforming process may not be satisfactory i.e. some parts of the blank may not be malleable enough to be correctly deformed and so the blank may be broken during deformation process. Furthermore, due to the insufficient temperature gradient, the ferritic-perlitic initial phase may not be completely transformed into austenite along the whole thickness of the blank, and consequently, in a subsequent quenching step, the desired microstructure e.g. martensite might not be created in those zones which had not been sufficiently heated. Furthermore, overheating the blanks may also lead to undesired changes of the material properties and/or may affect the coating.

A blank comprising thick regions may be left in the furnace for longer periods of time to ensure that such thick regions are adequately heated. The time the blank remains in the furnace may be modified e.g. by decreasing the speed of the conveyor system or by increasing the furnace length. Depending on the process, some furnace or furnace systems may be 25 meters long, or more, and moreover, as the length of the furnace grows, the occupied space increases accordingly. However, with such alternatives, the overall processing time may be substantially increased.

In conclusion, there is a need for methods and tools for processing blanks which at least partially solve some of the aforementioned problems.

SUMMARY

In a first aspect, a method for manufacturing a steel component from a blank is provided. Firstly, a blank is placed in a conveyor system. Then, at least a preselected zone of the blank is preheated while the blank is retained at a predetermined preheating location. Finally, the blank is conveyed through a furnace.

As a consequence of preheating, the time the blank remains in the furnace may be decreased, and thus, the length of the furnace may be reduced. A furnace length reduction involves costs reduction e.g. less energy consumption, and also reduces the space taken up by the furnace system. Furthermore, portions of a conveyor system may become dirty, i.e. they may become contaminated by the hot AlSi coating. By using preheating, the length of the contaminated portions may be reduced, and therefore, the costs related to the replacement of the parts which form the dirty portion may also decrease.

In some examples, the blank may be retained at a predetermined preheating location by stopping elements.

In some examples, the stopping elements may be retractable pins configured to be displaceable in an up-and-down motion for retaining the blank in the preheating location.

In some examples, the stopping elements may be elevating bars configured to lift the blank perpendicular to a conveying direction.

In some examples, the blank may be retained at the predetermined preheating location by stopping the conveyor system for a predetermined period of time.

In some examples, the preheating step may comprise preheating at least the thickest zone of the blank.

In some examples, the preheating step may comprise preheating the whole blank.

In some examples, the preheating step may comprise preheating the whole blank to a first temperature and preheating at least the thickest zone of the blank to a second temperature, wherein the second temperature is higher than the first temperature.

In some examples, the preheating step comprises heating at least a preselected zone of the blank below an Ac3 temperature, specifically between 300-820° C., more specifically between 500-700° C.

In some examples, the preheating step may be done in 25 seconds or less, preferably in 10 seconds or less.

In some examples, the method may further comprise transferring the heated blank to a press tool, hot deforming the blank and quenching the blank.

In a second aspect, a heating system for heating blanks in a production line is provided. The heating system comprises a furnace and a conveyor system for conveying the blanks through the furnace which is configured to temporarily retain the blank in a predetermined preheating location upstream from the furnace. The system also comprises a preheating system for preheating at least a preselected zone of a blank preheating location.

As the preheating system is placed just before the furnace i.e. not in a separate preheating system, the temperature of the preheated zones is not decreased as a consequence of being transferred from the preheating system to the furnace, which involves a homogeneous heating when exiting the furnace. Additionally, no extra time is added to the process as the preheating process uses the time that the blank remains in the conveyor system to preheat the preselected zones. The heating process can thus be improved, or optimized.

In some examples the heating system may comprise stopping elements to retain the blank at the predetermined location, wherein said stopping elements are retractable pins configured to be displaceable in an up-and-down motion or elevating bars configured to lift the blank perpendicularly to a conveying direction.

In some examples, the preheating system may comprise a base, at least one heating element and a support structure. In some examples, the heating elements may be infrared, induction, flame, fluid or electric heaters.

BRIEF DESCRIPTION OF THE DRAWINGS

Non-limiting examples of the present disclosure will be described in the following, with reference to the appended drawings, in which.

DETAILED DESCRIPTION

Figure 1:
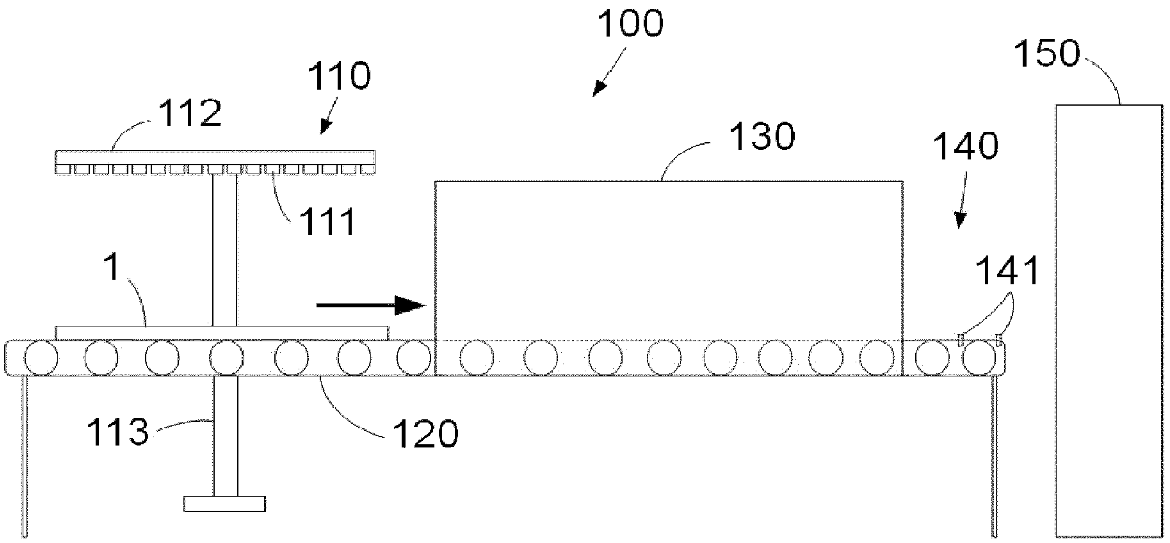
FIG. 1 schematically illustrates a side view of a production line according to an example.

FIG. 1 shows a blank 1 in a production line 100. The production line 100 may be e.g. a hot deformation or hot stamping production line which may comprise a conveyor system 120 to transport the blank 1 though the production line 100. The conveyor system 120 may comprise e.g. a plurality of conveyor rollers, parallel conveyor belts or walking beams. The conveyor system 120 in such a case may be driven using e.g. motors. In this case, the speed of the conveyor system 120 may be controlled by controlling the speed of the motors.

According to an example, the conveyor system 120 may comprise a feeding system and a furnace conveyor system to transport the bank through the furnace.

The blank 1 may be placed in the conveyor system 120 by e.g. an industrial transfer robot (not shown) e.g. after being cut from a steel coil, and may be conveyed to a preheating system 110.

The preheating system 110 may comprise a plurality of heating elements 111 arranged in a base 112 to preheat the blank 1 before entering the furnace. The base 112 of the preheating system 110 may be of any suitable size and shape, which may be determined e.g. by the dimensions of the blank. Accordingly, the number, size and shape of heating elements 111 may vary depending on e.g. the blank size or the desired blank configuration. A further support structure 113 may be used to fix the base 112 of the preheating system 110 to the floor. In other examples the support structure may be e.g. be coupled to the conveyor system, suspended from the ceiling or anchored to a wall.

The blank 1 may then be conveyed into the furnace 130 where it may be heated to a predetermined temperature, e.g. above an austenization temperature, so as to prepare the blank 1 for subsequent processes. In particular, the blank may be heated to Ac3 or above.

Depending on the blank material and the coating, the furnace temperature and the time that the blank remains in the furnace can vary. When the blank has been subjected to a preheating process as described before, the time in the furnace may be reduced compared to the time in the furnace of those blanks without a preheating process.

The heated blank 1 may exit the furnace 130 through a door (not shown) configured to open when the blank 1 arrives, and to close again when the blank 1 has left the furnace 130. The blank 1 may be transported by a conveyor system 120, e.g. a conveyor belt or a roller conveyor, to a centering system 140, e.g. a centering table, to be correctly positioned for subsequent processing.

A centering table 140 may comprise a plurality of centering pins 141 which can be passive or can be actively moved to correctly position and center the blank 1.

After being centered and correctly positioned, the blank 1 may be transferred to a press tool 150 for deforming and quenching. The blank 1 may be transferred to the press tool 150 by a transferring system (not shown), e.g. an industrial transfer robot, which may pick up the blank 1 from the conveyor system 120 and may place it on the pressing tool 150. The transfer robot may comprise a plurality of gripping units to grab and pick up the blank 1 from the conveyor means 120.

The pressing tool 150 may be provided with cooling means (not shown) e.g. water supplies or any other suitable means, to quench the blank 1 simultaneously to the hot deforming process. The cooling or quenching may be done homogeneously for the whole blank 1. Typically, channels may be provided in the dies of the press tool through which cold water or other liquid may be conducted. This cools the contact surfaces of the press tool so that the blank is quenched.

FIGS. 2*a*-2*d* show the blank 1 in a predetermined preheating location, e.g. under the preheating system, in which the blank 1 may be subjected to a preheating process. The blank 1 may be retained in the predetermined preheating location e.g. where the preheating system overlaps substantially the whole blank or at least the preselected zone to be preheated, during the entire preheating process. The blank 1 may be preheated about 15 seconds or less at a temperature between 600-700° C. During the preheating process the blank 1 may still in the predetermined preheating location.

Figure 2A:
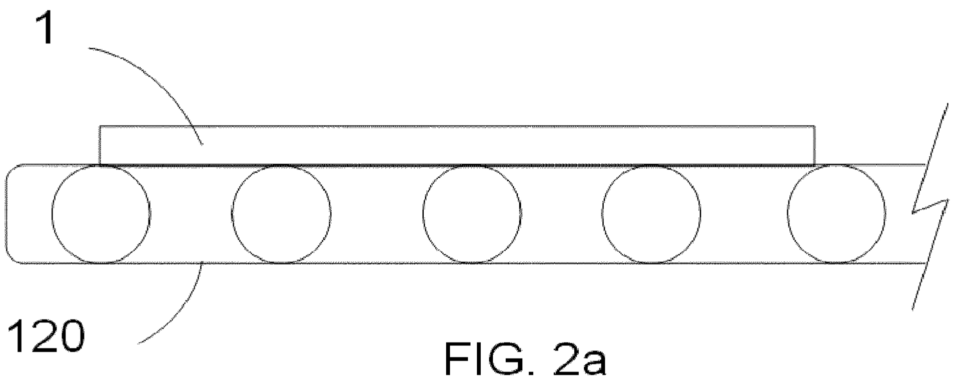
FIGS. 2*a*-2*d* schematically illustrate different examples for retaining a blank in a predetermined preheating location.

In the example shown in FIG. 2*a*, the blank 1 is retained in a predetermined preheating location by stopping the conveyor system 120 e.g. a conveyor belt. According to this example, the blank 1 would firstly be conveyed to the predetermined preheating location. Secondly, the blank would be retained in that position, i.e. predetermined preheating location, by stopping the conveyor system e.g. stopping the motion of the conveyor belt(s). The blank would then be preheated, and finally, once the preheating process has finished, the blank would be conveyed to the furnace.

A conveyor system comprising conveyor rollers o walking beams may alternatively be used. In these examples, the conveyor system is stopped by avoiding the upward and forward movement of the walking beams or the rotation of the conveyor rollers.

The conveyor system 120 may be programmed to stop its movement when the blank is detected in the appropriate position e.g. by using sensors. In other examples the conveyor system may be programmed to stop periodically e.g. every 15-30 seconds.

Figure 2B:
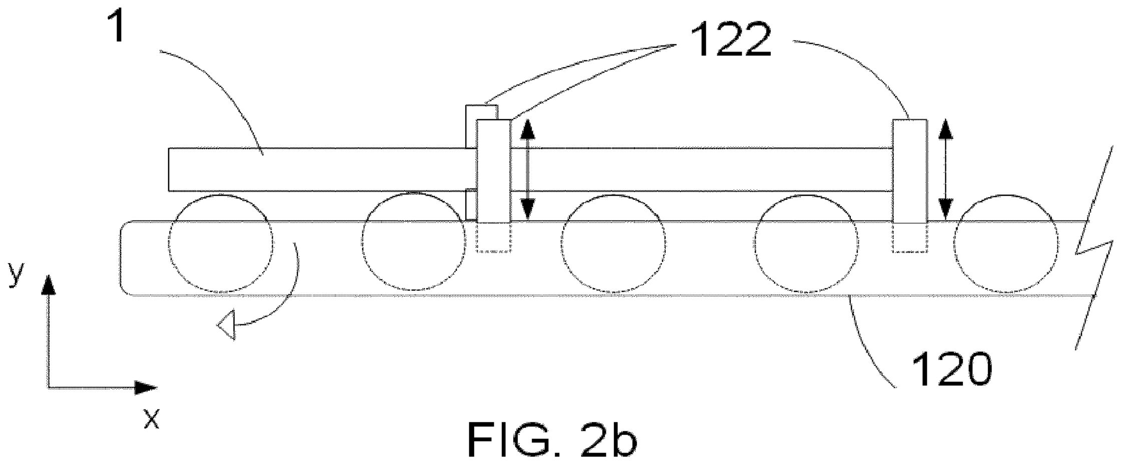
Figure 2C:
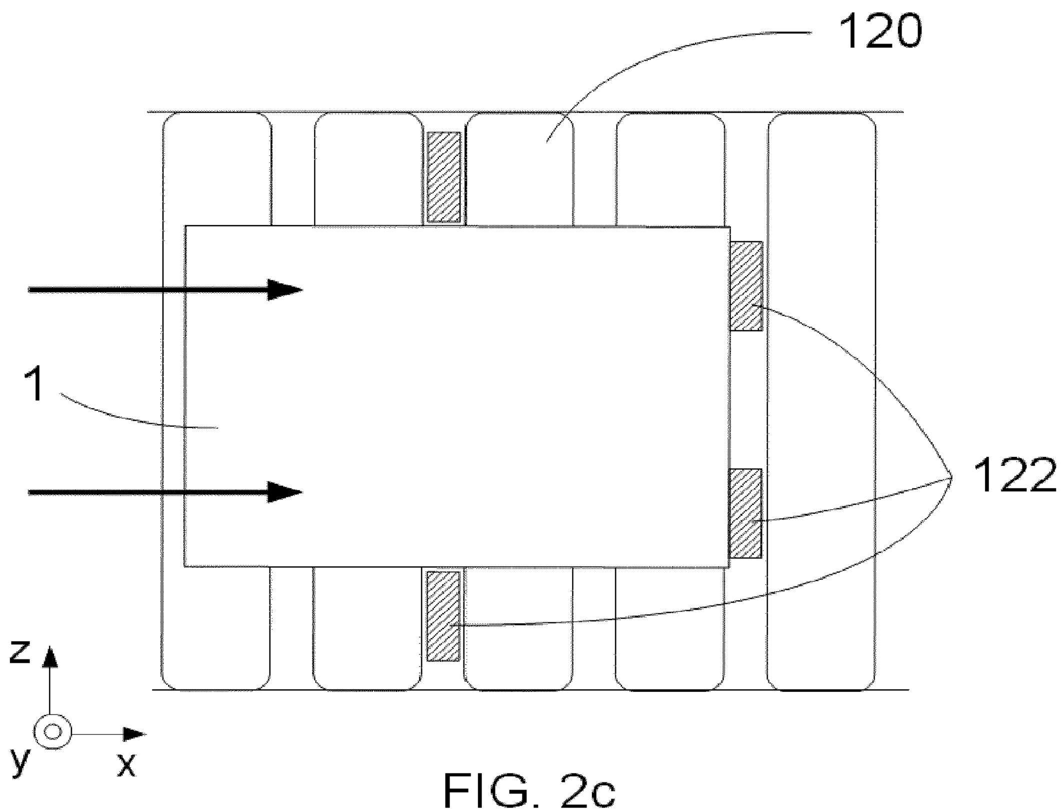

FIGS. 2*b* and 2*c* show a lateral view and a top view respectively of a conveyor system 120, e.g. conveyor rollers or walking beams, which may comprise at least a stopping element configured to retain the blank in the predetermined preheating location. Such stopping elements may be retractable pins 122.

The retractable pins 122 may be configured to be up-and-down displaceable for retaining the blank 1 in a predetermined preheating location i.e. avoiding its forward movement in the conveying direction (indicated by the x axis). A difference between this example and the example of FIG. 2*a* is that the conveyor system 120 of FIGS. 2*b* and 2*c* may be operating at a substantially constant speed. As only the blank that is preheated is stopped, there is no need to interrupt the operation of the other blanks.

The retractable pins 122 may be retracted e.g. under the conveyor system 120, until the blank 1 is detected e.g. by sensors. The retractable pins 122 may be configured to move up to retain the blank 1 when the blank 1 is detected in an adequate location, i.e. a predetermined preheating location.

The retractable pins 122 may be in the "up" position, i.e. totally protruding, before and during the preheating process. In the same way, the retractable pins 122 may be configured to retract after the preheating process has finished, and so, the blank 1 may be conveyed to the furnace.

Figure 2D:
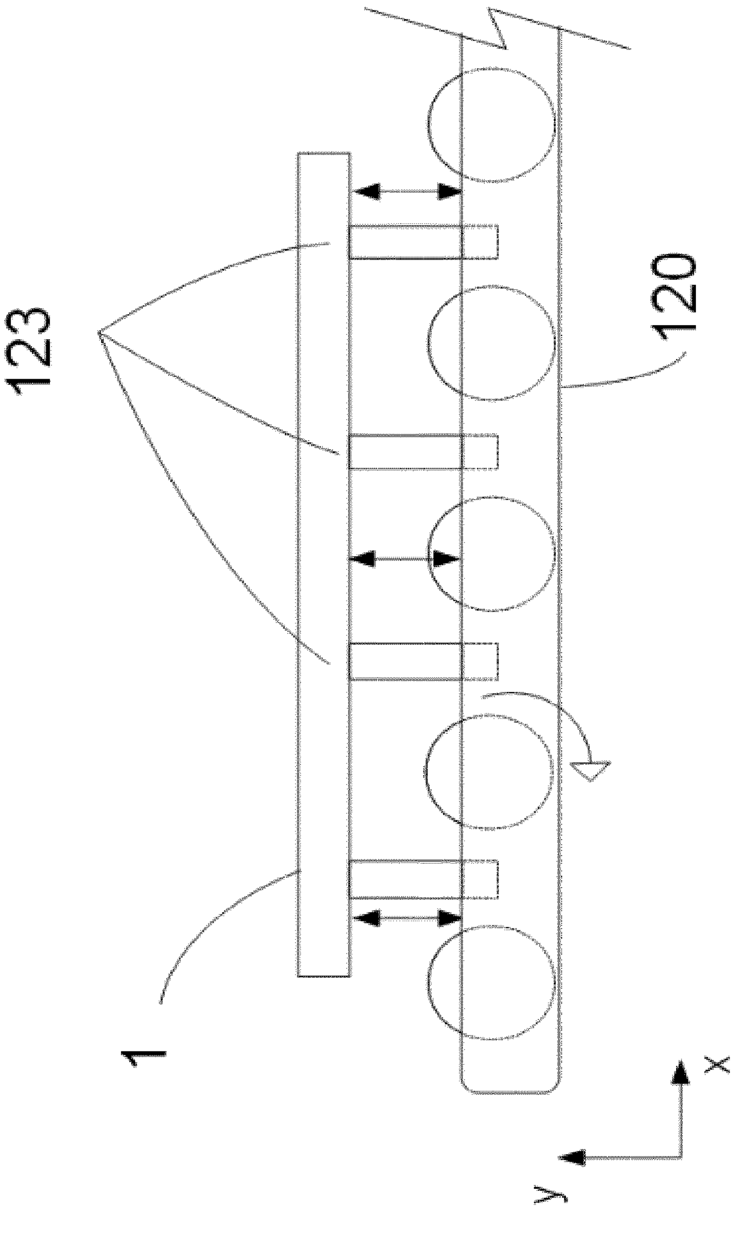

FIG. 2*d* shows another example to retain the blank 1 in a predetermined preheating location. In the example of FIG. 2*d*, the stopping elements or stops may be elevating bars 123 configured to displace the blank 1 perpendicularly to a conveying direction x. The elevating bars 123 may be located interleaved with the conveyor system 120 e.g. a plurality of conveyor belts or conveyor rollers, so as to avoid blocking the movement of the conveyor system 120.

The elevating bars 123 may be configured to be perpendicularly displaceable (indicated by the y axis) to the conveying direction when the bank 1 is detected, e.g. by sensors, in a predetermined preheating location. According to this example, the elevating bars 123 may be "hidden", i.e. retracted, until the blank 1 is in a predetermined preheating location. At that time, the elevating bars 123 would project outwardly and the blank 1 would therefore be perpendicularly displaced from the conveyor system 120 i.e. it would be elevated above the conveyor system (while the conveyor continues operating). The blank 1 may then be subjected to a preheating process. After the preheating process, the elevating bars 123 may be retracted and thus, the blank 1 may be placed onto the conveyor system 120 to be conveyed to the furnace.

Figure 3A:
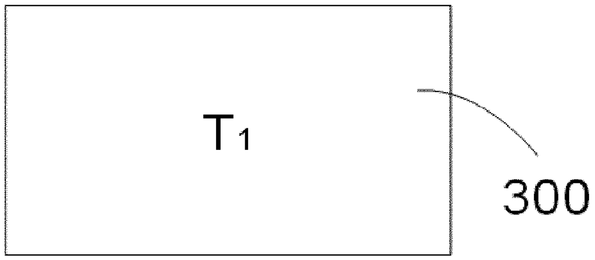
FIGS. 3*a*-3*c* schematically illustrate various blanks heated according to different examples.

FIG. 3*a* depicts a rectangular blank 300 which has been preheated at $T_1$ temperature, e.g. 630° C. When heating a blank (with or without zones of different thickness), it may be desirable to increase the efficiency of the heating process e.g. reducing the heating time. By preheating the blanks (or at least certain zones of the blank) the heating process may be optimized as the blanks may stay less time in the furnace. Moreover, as the time in the furnace may be reduced, the furnace length may be decreased which, at least, reduces the energy consumption and the space taken up by the furnace.

Figure 3B:
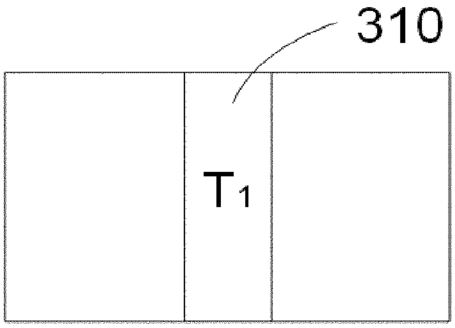

FIG. 3*b* shows a rectangular blank, the central zone 310 of which has been preheated to $T_1$ temperature. The preheated zone 310 may correspond to e.g. the thickest zone of the blank. By preheating the thick zone of a blank, a homogeneous heating e.g. above Ac3, of the whole blank may be assured in a subsequent heating process.

Figure 3C:
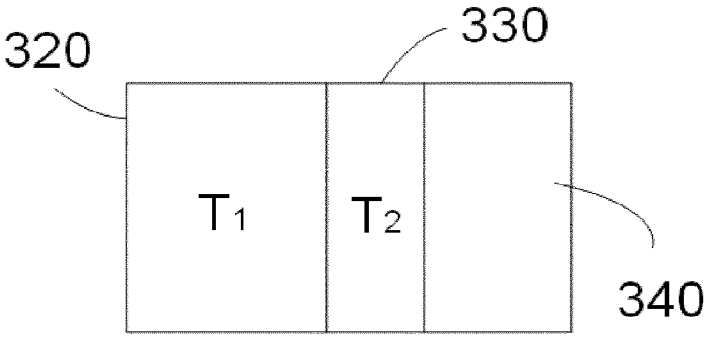

Additionally, in a blank with zones of different thickness and/or different materials, e.g. a TWB, each zone may be preheated at a different temperature. FIG. 3*c* illustrates a rectangular blank with three zones of different thicknesses, and wherein the temperature at which each zone has been preheated is different. A first zone 320 may be preheated at $T_1$, a second zone 330 which may correspond to the thickest zone of the blank, may be heated at $T_2$ e.g. between 600-700° C. and finally, a third zone 340, which may correspond to the thinner zone of the blank, may not be heated. Temperature $T_2$ corresponding to the second zone, i.e. the thickest zone of the blank is therefore higher than the $T_1$ corresponding to the first zone.

In other examples, the whole blank may be preheated at $T_1$ while a predetermined zone, e.g. the thickest zone of the blank, may be preheated at $T_2$, wherein $T_2$ is higher than $T_1$.

In some examples, the blank may be made of different materials (e.g. different types of steels) which may e.g. have different thermal conductivities. Each material may therefore need to be heated for a specific heating time to reach a predetermined temperature. In such cases the different material areas may be heated at different temperatures.

Figure 4A:
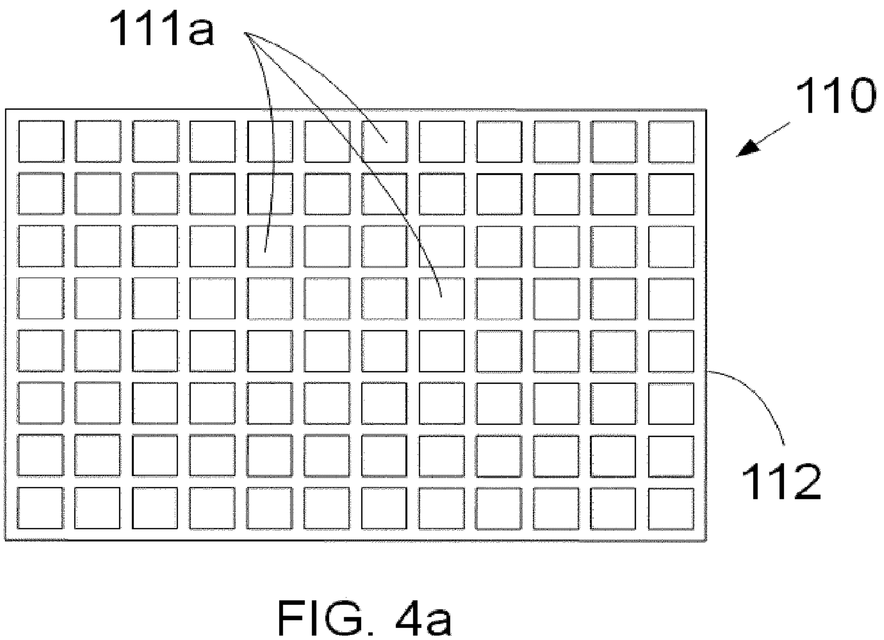
FIGS. 4*a* and 4*b* schematically illustrate examples of a preheating system.

FIG. 4*a* depicts a preheating system 110 comprising a rectangular base 112 and heating elements 111*a* arranged on it. In the depicted example, all the heating elements 111*a* are switched on, and therefore the whole blank would be preheated (see FIG. 3*a*).

Figure 4B:
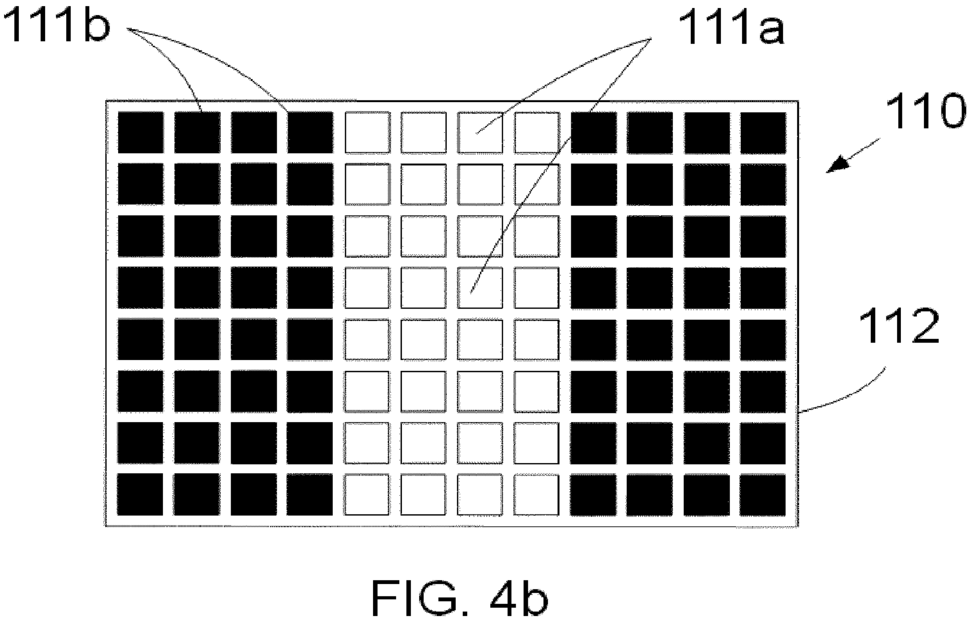

In other examples, the blank may be selectively preheated. FIG. 4*b* shows an example of a preheating system 110 wherein the heating elements 111*a*, 111*b* may be configured to selectively turn on and off for locally preheating only preselected zones of the blank, and thereby a heating pattern is created. In the example of FIG. 4*b* only a central zone of the blank would be preheated (see FIG. 3*b*).

The pattern may be formed by arranging the heating elements 111*a*, 111*b* in a predetermined manner (not shown) or it may be created by selectively switching off certain heating elements 111*b* while leaving other heating elements 111*a* switched on as shown in FIG. 4*b*. The switched on heating elements 111*a* preheat preselected zones of the blank at a desired temperature, for example at a temperature between 600-700° C.

In further examples, the amount of heat delivered by the heating elements 111*a* that are switched on may be regulated, e.g. controlling the power of the heating elements, so that different temperatures may be achieved.

By switching the heating elements on or off and/or by controlling the output power of the heating elements a tailored heating pattern taking into account e.g. the dimensions of the blank and/or the position of the preselected zone of the blank to be preheated, can be provided.

In some examples, the heating elements 111*a*, 111*b* may be infrared heaters, particularly infrared heating lamps. In other examples, induction heaters, flame or hot air directed to the blank may be used. In other examples, the blank may be heated by contacting a heating plate which is heated by electric heaters embedded in the heating plate or by a hot fluid, e.g. water, oil, etc., flowing through channels.

Figure 5:
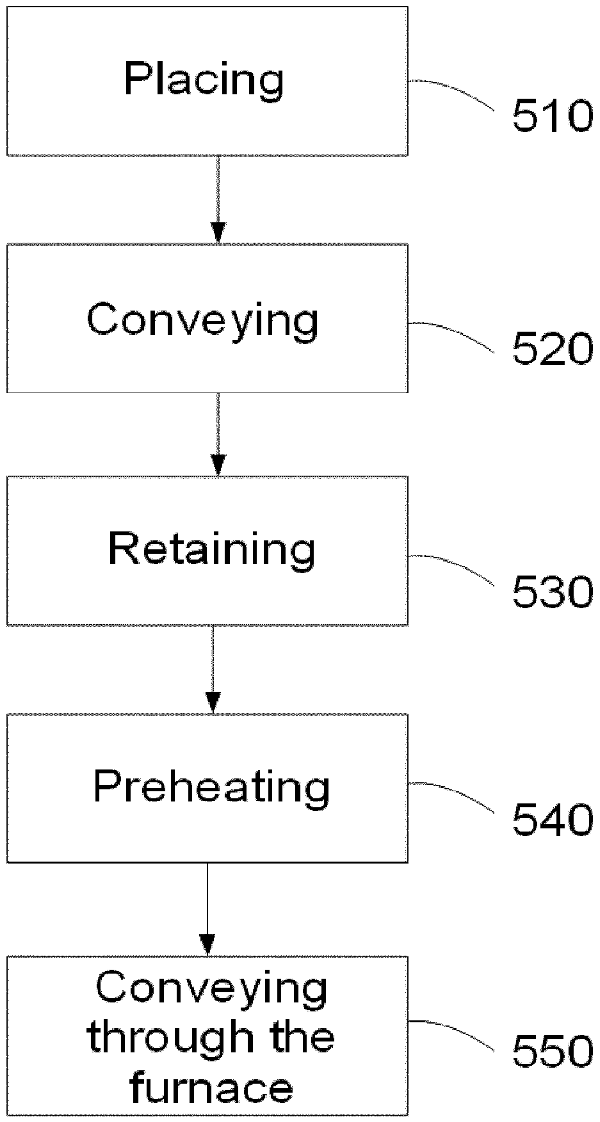
FIG. 5 schematically illustrates an example of a method for manufacturing a blank.

FIG. 5 shows a method to manufacture a steel component from a blank with zones of different thickness according to an example. Firstly, a blank may be placed 510 in a conveyor system e.g. by an industrial transfer robot. Optionally, if the blank has not been positioned in a predetermined preheating location the blank may be then conveyed 520 to a suitable preheating location, i.e. in a proper position with respect to a preheating system. Once in the predetermined preheating location, the blank may be retained 530 in such position e.g. by stopping the conveyor system or by stops or stopping elements as described before. The blank, or at least a preselected zone of the blank and in particular a zone of the blank that has increased thickness, may then be preheated 540 e.g. at a temperature of about 600-700° C. during less than 15 seconds.

When the preheating process is ended, the blank may be conveyed through the furnace 550 to be heated e.g. at a temperature above Ac3. The blank may be in the furnace for about 3 minutes. After the heating process, the heated blank may exit the furnace and may be centered and correctly positioned in a centering system e.g. centering table, arranged downstream. The blank may then be transferred to a press tool e.g. by an industrial transfer robot, where it may be hot deformed to obtain (almost) the final shape. The blank may also be entirely or partially quenched in the press tool e.g. by supplying cold water. Optionally the blank may further be subjected to post processing steps such as e.g. cutting, trimming, and/or joining to further components using e.g. welding.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for manufacturing a steel component from a blank, the method comprising:

placing a blank on a conveyor system, the blank comprising a first zone made from a first material having a first Ac3 temperature and a second zone made from a second material, different from the first material, and having a second Ac3 temperature; followed by preheating the blank by performing a preheating process comprising (1) directing heat at the first zone and not the second zone to preheat the first zone; or (2) applying heat to both the first and second zones to preheat both the first and second zones such that the second zone is preheated to a temperature different from a temperature of the first zone; and after completion of the preheating, conveying the preheated blank through a furnace having a furnace temperature, the furnace temperature being (i) at or above the first Ac3 temperature such that the furnace heats the blank to a temperature equal to or above the first Ac3 temperature temperature; or (ii) at or above the second Ac3 temperature such that the furnace heats the blank to a temperature equal to or above the second Ac3 temperature temperature, and wherein the preheating comprises retaining the blank at a predetermined preheating location upstream of the furnace.

2. A method for manufacturing a steel component from a blank, the method comprising:

placing a blank on a conveyor system, the blank comprising two zones that are made from a different material, resulting in the two zones to have different Ac3 temperatures of Ac3' and Ac3";

preheating the blank by a preheating system by performing a preheating process comprising (1) directing heat to one of the two zones and not to the other of the two zones to preheat the at least one of the two zones; or (2) preheating the two zones to different preheating temperatures, the preheating temperatures being below Ac3' and Ac3"; and conveying the preheated blank through a furnace, positioned downstream from the preheating system and having a furnace temperature at or above Ac3' or Ac3" for heating the blank to a temperature equal to or above the Ac3' or Ac3".

3. A method for manufacturing a steel component from a blank, the method comprising:

placing a blank on a conveyor system, the blank comprising two zones that have a different thickness;

preheating the blank by a preheating system by performing a preheating process comprising (1) directing heat to one of the two zones and not to the other of the two zones to preheat the one zone of the two zones; or (2) preheating the two zones to different preheating temperatures, the preheating temperatures being below an Ac3 temperature of the blank; and conveying the preheated blank through a furnace, positioned downstream from the preheating system and having a furnace temperature at or above the Ac3 temperature for heating the blank to a temperature equal to or above the Ac3 temperature.

* * * * *